United States Patent
Bonin et al.

(10) Patent No.: US 9,746,843 B2
(45) Date of Patent: Aug. 29, 2017

(54) CONFIGURABLE SECURITY MONITORING FOR A ROBOT ASSEMBLY

(71) Applicant: KUKA Laboratories GmbH, Augsburg (DE)

(72) Inventors: Uwe Bonin, Friedberg (DE); Jonas Rumping, Munich (DE); Marc-Walter Ueberle, Friedberg (DE); Christian Hartmann, Konigsbrunn (DE); Denis Pesotski, Friedberg (DE); Botond Gorog, Grafelfing (DE); Giulio Milighetti, Friedberg (DE); Robert Bertossi, Gersthofen (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 14/151,348

(22) Filed: Jan. 9, 2014

(65) Prior Publication Data

US 2014/0195051 A1     Jul. 10, 2014

(30) Foreign Application Priority Data

Jan. 9, 2013     (DE) .................. 10 2013 000 250

(51) Int. Cl.
| | |
|---|---|
| *B25J 19/06* | (2006.01) |
| *G05B 19/042* | (2006.01) |
| *B25J 9/16* | (2006.01) |

(52) U.S. Cl.
CPC ........ *G05B 19/0428* (2013.01); *B25J 9/1676* (2013.01)

(58) Field of Classification Search
CPC ....... G05B 19/0428; G05B 2219/14039; B25J 9/1676; B25J 9/1674; Y10S 901/01

(Continued)

(56) References Cited

U.S. PATENT DOCUMENTS

| | | | |
|---|---|---|---|
| 4,804,860 A | * | 2/1989 | Ross et al. .................... 307/117 |
| 5,241,482 A | | 8/1993 | Iida et al. |

(Continued)

FOREIGN PATENT DOCUMENTS

| | | |
|---|---|---|
| CN | 101149608 A | 3/2008 |
| CN | 101200066 A | 6/2008 |

(Continued)

OTHER PUBLICATIONS

German Patent Office; Search Report in German Patent Application No. 10 2013 000 250.8 dated Oct. 18, 2013; 5 pages.

(Continued)

*Primary Examiner* — Dalena Tran
(74) *Attorney, Agent, or Firm* — Wood Herron & Evans LLP

(57) ABSTRACT

A method of safety monitoring for a robot assembly with at least one robot that is configured with a linking function arrangement with at least one first linking function including a fixed and predetermined number of monitoring functions of a monitoring function arrangement. The monitoring functions are logically linked to one another such that the first linking function has a reaction state whenever all of the monitoring functions indicate the violated and/or error state. The first linking function does not have a reaction state whenever any monitoring function from the plurality of monitoring functions does not indicate the violated and/or error state. The reaction state is executed by the controller when all of the monitoring functions are in the violated and/or error state.

19 Claims, 1 Drawing Sheet

(58) Field of Classification Search
USPC .......................... 700/253, 245, 250, 255–261; 318/568.11–568.18
See application file for complete search history.

(56) References Cited

U.S. PATENT DOCUMENTS

2002/0186299 A1* 12/2002 Cofer ............................ 348/152
2010/0145515 A1 6/2010 Nakanishi et al.
2010/0179690 A1* 7/2010 Matthias et al. .............. 700/253

FOREIGN PATENT DOCUMENTS

| | | |
|---|---|---|
| CN | 101351753 A | 1/2009 |
| CN | 101992470 A | 3/2011 |
| DE | 102007028390 A1 | 12/2008 |
| DE | 102008015948 A1 | 10/2009 |
| DE | 102008021671 A1 | 11/2009 |
| DE | 102008024950 A1 | 11/2009 |
| DE | 102010048369 A1 | 4/2012 |
| JP | H8225206 A | 9/1996 |

OTHER PUBLICATIONS

Chinese Patent Office; Examination Report in Chinese Patent Application No. 201410010608.2 dated Jun. 14, 2017; 21 pages.

* cited by examiner

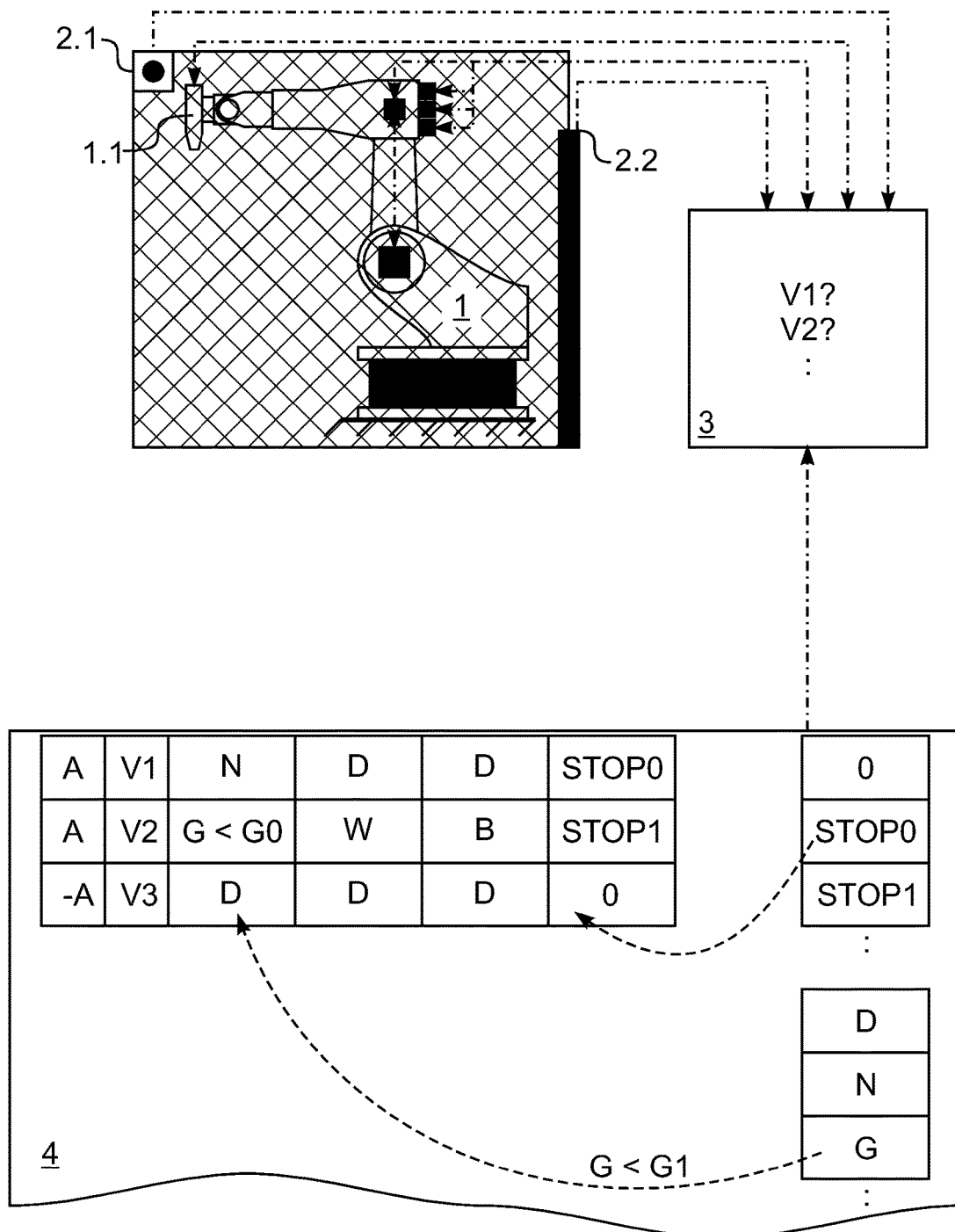

CONFIGURABLE SECURITY MONITORING FOR A ROBOT ASSEMBLY

TECHNICAL FIELD

The present invention relates to a configurable safety monitoring system for a robot assembly.

BACKGROUND

Robot assemblies with one or more robots are safety monitored according to internal practice, for example for a speeding or protection chamber violation by a robot, the actuation or the presence of an emergency stop or the like. If a violation was observed, up to now the complete robot assembly was securely shut down.

However, such a shutdown, in particular with the corresponding expenditure for resumption of automatic operation, is not necessary in every case. For example, if a sensor that monitors a protective fence door has a malfunction, an initial set-up mode or test mode, in which an operator is within the workspace of the robot assembly with an activated approval switch, i.e. the protective fence door may be opened, can in principle be continued.

SUMMARY

The present invention addresses the problem of improving a safety monitoring system for a robot assembly.

A robot assembly according to one aspect of the present invention has one or more robots, in particular industrial and/or lightweight robots, preferably with six or more axes of movement. In one further development the robot assembly has a controller for controlling the robot or robots, wherein the controller, at least sometimes, can be centrally designed or equipped for controlling several robots and/or have individual controllers for controlling one robot each.

In one design the robot assembly has a detection means assembly with two or more detection means for, in particular redundant, preferably diverse, detection of a single or multi-dimensional security quantity. A detection means as defined by the present invention can in particular be designed for detecting a position and/or speed of one or more, in particular all, joints of one or more robots of the robot assembly. In one further development the detection means can be designed for detecting a position, orientation and/or speed of a robot-fixed reference point, in particular of the TCP, a robot-guided tool or the like. In addition or as an alternative, a detection means can be designed for detecting an emergency stop, in particular as an emergency stop switch. In addition or as an alternative, a detection means can be designed for detecting an approval of an operator for moving the robot assembly, in particular as, preferably a three-step, confirm switch. In addition or as an alternative, a detection means can be designed for detecting a selected operating mode, in particular an automatic operating mode, in which the robot assembly automatically runs a predefined program, a setup operating mode, in which the robot assembly can be moved manually, and/or a test operating mode, in which the robot assembly manually controls a predefined program and/or runs it at reduced speed, in particular as an operating mode selection switch. In addition or as an alternative, a detection means can be designed for monitoring a room, in particular for optical, thermal, capacitive, inductive and/or electromagnetic detection of robots of the robot assembly and/or of obstacles, in particular of persons. In addition or as an alternative, a detection means can be designed for monitoring an operator protection unit, in particular for monitoring one or more protective fence openings, in particular door(s). In addition or as an alternative, a detection means can be designed for detecting a tool, in particular for detecting a presence, a type and/or an operating state of a robot-guided tool. In addition or as an alternative, a detection means can be designed for detecting an input, in particular a secure input, in particular a secure signal input. Additional security functions can be implemented advantageously via a secure (signal) input.

According to one aspect of the present invention, a safety monitoring means for such a robot assembly has a configuration means which is equipped for configuring a linking function arrangement.

A means as defined by the present invention can be designed by hardware or software, in particular having one or more programs or program modules and/or microprocessor unit, preferably linked by data or signals with a memory and/or bus system, in particular a digital, processing microprocessor unit, which is equipped by software to run such a program (module) or for carrying out an inventive method.

The linking function arrangement has one or more linking functions. In one design the linking function arrangement can have a variable number of linking functions or a user can generate one or more linking functions. In another design the linking function arrangement can have a fixed predetermined number of linking functions, of which a user in one further development can optionally enable or disable one or more said functions. Similarly, in one design linking functions generated by the user can optionally be enabled or disabled.

In at least one, preferably in more than one, in particular in all linking functions of the linking function arrangement a number of monitoring functions of a monitoring function arrangement are logically linked to one another. The number of monitoring functions of one, in particular of all linking functions is in one design, in particular for all linking functions equal, fixed and predetermined and/or amounts to at least two, in particular exactly three. It turns out that the majority of all application cases can be covered by a maximum of three monitoring functions logically linked to one another, wherein at the same time the complexity and thus the manageability and susceptibility to error of the safety monitoring system is optimized.

If in one linking function, whose number of monitoring functions is for example fixed and predetermined at three, for example only one or two monitoring functions should be considered, in one design of the present invention a dummy monitoring function can be provided, with which the predetermined number of monitoring functions can be filled in, in particular automatically, preferably preallocated by default.

The individual monitoring functions of the monitoring function arrangement can have in each case, depending on one or more signal inputs of the robot assembly, in particular of the detection means assembly, a first state, a second state differing from the first state and a third state differing from the first and second states, said states being referred to in the following without limiting the generality as "violated" or violated state, "non-violated" or non-violated state and "error" or error state. In the present disclosure a state of a function is defined in particular as its value. For example a function can be implemented by an identifier ("Flag"), which can optionally have a first, second or third value, for example "0", "1" and "2" or "−1" or the like, and which defines the state of the function.

In one design, a monitoring function has the violated state whenever an associated monitoring or a monitoring displayed by the monitoring function is activated or an event monitored by the monitoring system occurs or has occurred and said event is or has been recorded in particular by the detection means assembly. For example, an emergency stop monitoring function can have the violated state when an emergency stop is actuated or activates an emergency stop monitoring.

Correspondingly, in one design a monitoring function has the error state when an associated monitoring or a monitoring displayed by the monitoring function is defective and this is recorded in particular by the detection means assembly, for example an emergency stop switch or its signal connection with the safety monitoring means is defective, for example there is a two channel error, and records this.

In one embodiment, a monitoring function has the non-violated state, when or as long as each of the associated monitoring functions does not have the violated state or the error state.

According to this facet of the present invention hence (at least) three-valued monitoring functions are provided.

In one embodiment, the monitoring functions are logically linked to one another in one or more first linking functions such that the first linking function has a reaction state only when none of the monitoring functions of the linking function has the non-violated state:

$(Z_1=\text{"non-violated"}) \vee (Z_2=\text{"non-violated"})$
$\vee (Z_3=\text{"non-violated"}) \Leftrightarrow Z_v \neq \text{"reaction state"}$ with the states $Z_i$ of the three monitoring functions i=1, 2, 3, the state $Z_v$ of the linking function and the logical OR operation or disjunction $\vee$, which is not true only when all linked arguments are not true.

In one embodiment, a reaction can be triggered advantageously only when or whenever this is also necessary. For example, if a robot can be moved with any orientation when its laser tool is disconnected or when there are no human beings in its workspace, an orientation function, a tool monitoring function and an operator protection monitoring function can be linked to one another in accordance with the invention so that the robot will only shut down if the robot has an impermissible orientation, although its laser tool is switched on and a human being could be in its workspace due to an opened protective fence door. On the other hand, in one embodiment, as long as the robot moves safely with the correct orientation (orientation monitoring function "non-violated" or neither "violated" nor "error") or the laser tool is safely disconnected (tool monitoring function "non-violated" or neither "violated" nor "error") or no human being can safely be in its workspace (Operator protection monitoring function "non-violated" or neither "violated" nor "error"), the robot does not have to be shut down, even if one of these monitors is activated or has a malfunction, for example an orientation, tool or protective fence door sensor is defective. Such a malfunction, as a result of which the corresponding monitoring function has the error state, can be output in one design by an output means, in particular optically and/or acoustically, to a user and or by means of technical signals to a controller.

Hence, in this design an activation or an error state of a monitoring function does not necessarily lead to a shutdown of the complete robot assembly. In addition, the inventive configuration possibility can offer a high flexibility, simple manageability and/or low susceptibility to error by linking at least two monitoring functions to a linking function.

In one embodiment, the foregoing explained logical linking can have, as described, in particular one or more OR operations, in particular consisting of this, so that all monitoring functions of the linking function must have the violated or error state, in order to trigger a reaction state. In one embodiment, the inventive linking can also be implemented with AND operations or due to the fact that the linking function does not have the reaction state, when all of its linking functions have the violated or error state:

$(Z_1=\text{"non-violated"}) \vee (Z_2=\text{"non-violated"})$
$\Leftrightarrow (Z_1=\text{"violated"} \vee \text{"error"}) \wedge (Z_2=\text{"violated"} \vee \text{"error"})$ with the logical AND operation or conjunction $\wedge$, which is true when all linked arguments are true.

In one embodiment, an inverting of at least one monitoring function can also be provided or the configuration means can be equipped for optional inverting of at least one monitoring function.

For example, one secure input can constitute a violation of a safety monitoring system through a "low" signal, a "0" or the like, a further secure input on the other hand can be a violation of a further safety monitoring system through a "high" signal, a "1" or the like. In order to be able to link both secure inputs with one another, as explained in the foregoing, in one design of the present invention one of the two monitoring functions can be inverted, so that both constitute a violation of their respective safety monitoring system by the same signal or the same value. An inverted monitoring function can in particular only have the violated state when the monitoring function itself has the non-violated state, and can have the non-violated state, when the monitoring function itself has the violated state or the error state. In another design an inverted monitoring function can have the violated state, when the monitoring function itself has the non-violated state or the error state, and can only have the non-violated state when the monitoring function has the violated state.

As with the foregoing explained monitoring functions it can also be expedient to invert a linking function, for example, in order to optionally assign a secure output as a reaction state with "high" or "low" signal a "1" or "0" or the like. Therefore, according to one design of the present invention, in addition to or as an alternative to one or more first linking functions, monitoring functions in one or more second linking functions are each logically linked to one another such or can be linked such that the second linking function does not have a reaction state whenever all monitoring functions of this linking function have the violated state:

$(Z_1=\text{"violated"}) \wedge (Z_2=\text{"violated"}) \wedge (Z_3=\text{"violated"})$
$\Leftrightarrow Z_v \neq \text{"reaction state"}$ The statements about the first linking functions also apply in corresponding manner for the second linking functions, so that reference is made to them. In particular, the foregoing explained logical linking can likewise be implemented with OR operations or due to the fact that the second linking function has the reaction state when at least one of its linking functions has the non-violated or error state.

A second linking function can, with due regard to the multi-valued monitoring functions, correspondingly be considered in particular an inverted first linking function. Therefore, in general in one design an inverting of at least a first to a second linking function and/or of a second to a first linking function can be provided or the configuration means can be equipped for optional inverting of at least a first linking function to a second linking function and/or of a second to a first linking function. One or more second linking functions can in particular also have one or more inverted monitoring functions. In general, the foregoing and following statements about (first) linking functions also apply in particular for second linking functions.

In particular by the optional inverting of individual monitoring functions and/or of linking functions, in one design the power of the safety monitoring means or method can be increased.

In one design, the linking function arrangement can, in particular by software, preferably by activation of an icon, be configured due to the fact that the user generates one or more linking functions and/or optionally activates or deactivates one or more, in particular predefined, linking functions. In one further development, during operation only the activated linking functions can be evaluated or monitored. In one further development one or more primary linking functions of the linking function arrangement cannot be deactivated and one or more secondary linking functions of the linking function arrangement can be optionally deactivated, wherein first and/or second or inverted linking functions can each be primary or secondary linking functions. In this way, in particular essential monitoring can be implemented by non deactivatable linking functions and thus protected from an accidental deactivation, while at the same time in particular, non essential monitoring can be optionally deactivated, in order to further increase the flexibility of the safety monitoring system.

In one design, one or more linking functions can, in particular by software, preferably by activation of an icon, be configured due to the fact that the user selects a reaction state from several predefined reaction states. For example the user can optionally select a STOP 0, a STOP 1, a STOP 2, a warning message, the start of a secure pose, the deactivation or activation of a, in particular secure, output or the like as reaction state or reaction from a library. In addition or as an alternative, the user can parameterize the selected or a predefined state, for example specify a speed at which a secure pose is to be approached.

As stated above, presently a state of a function is defined in particular as its value. If a linking function has a reaction state, in one design, in particular by an evaluation and reaction means, a reaction predefined by the linking function or its reaction state is triggered, for example an output, preferably a secure one, is correspondingly assigned.

In one design, one or more, in particular all monitoring functions of one or more, in particular all linking functions of the linking function arrangement, can be configured in particular by software, preferably by activation of an icon, due to the fact that the user selects the respective monitoring function from several predefined monitoring functions or a predefined monitoring function arrangement or library, in particular from an emergency stop monitoring function, which in one design has exactly one violated state whenever an emergency stop is actuated, of an operating mode monitoring function, which in one design has exactly one violated state whenever a predefined or parameterized operating mode is selected or has been executed, in particular an automatic, test or setup mode, of a speed monitoring function, which in one design has exactly one violated state whenever one or more joints and/or robot-fixed reference points of the robot assembly exceed a predefined or parameterized speed, of a space monitoring function, which in one design has exactly one violated state whenever the robot assembly penetrates a predefined or parameterized protection chamber or exits a predefined or parameterized workspace, of an operator protection monitoring function, which in one design has exactly one violated state whenever there is no operator protection, in particular a protection chamber access is opened and/or an approval is not recorded, of a tool monitoring function, which in one design has exactly one violated state whenever the robot assembly is carrying or not carrying a predefined or parameterized tool or a robot-guide tool has a predefined or parameterized operating state, in particular is activated or shut down, of an axis adjustment monitoring function, which in one design has exactly one violated state whenever one or more predefined or parameterized axes of the robot assembly are not adjusted, and/or of a monitoring function of an input, preferably a secure input. In addition or as an alternative, the user can parameterize the selected or predefined monitoring function, for example predefine a threshold speed of a speed monitoring function, which is the maximum speed a robot may move.

In one design the predefined monitoring function arrangement has a first dummy monitoring function, which always has the violated state, in one further development all monitoring functions of first and/or second linking functions of the linking function arrangement initially or by default are allocated the first dummy monitoring function. In addition or as an alternative, second and/or first linking functions of the linking function arrangement initially or by default are allocated second dummy monitoring functions, which always have the non-violated state. Correspondingly, in one design the predefined monitoring function arrangement in addition or as an alternative has a second dummy monitoring function, which always has the non-violated state In this way it is also possible to monitor individual monitoring functions or monitoring function links that are not fully allocated with a consistent, uniform linking function arrangement structure.

For example an emergency stop monitoring, which is supposed to be always carried out by additional monitoring systems or separately from said monitoring systems, can be implemented due to the fact that an emergency stop monitoring function is linked to first dummy monitoring functions, in order to reach or allocate the number of the monitoring functions of a first linking function. Since these always have the violated state, the linking function in this case always occupies the reaction state whenever (also) the emergency stop monitoring function has the violated or error state, i.e. depends only on the stop monitoring function.

In one design the linking function arrangement, in a further development the activated linking functions of the linking function arrangement are continuousy evaluated by an evaluation and reaction means during an operation of the robot assembly, in particular irrespective of a state of the robot assembly and/or of a process carried out by said robot assembly, preferably periodically. Dependent on a reaction state of the linking function arrangement the evaluation and reaction means triggers a reaction predefined by the linking function, for example a STOP 0, STOP 1, STOP 2 or a deactivation (or activation) of an output, in particular of a secure output if this is predefined as the reaction state of the respective linking function.

In one design provision can be made or the configuration means can be configured to use the same monitoring function in two or more linking functions, in one further development being parameterized differently, for example with different threshold speeds. This can in particular be implemented as a result of the fact that several instances of the same monitoring function are provided or can be selected or parameterized by the user.

In particular in such a case—as a result of the same monitoring function—several linking functions can have one reaction state. In particular for this case, in one design of the present invention provision can be made that depending on the reaction states of two or more linking functions of the linking function arrangement a higher ranking reaction will be triggered. For example, if a linking function has the reaction state STOP 1, another has the reaction state STOP 0, a STOP 0 can be carried out as the higher ranking reaction. In particular, in one design a preferably secure output can always be deactivated or always activated when at least one linking function that is linked to this output or is allocated to it has the reaction state. In other words, in one design the level "0" can always prevail, in another design the level "1" or "High" can always prevail.

As stated above, the configuring of the linking function arrangement can take place in particular graphically through selection, in particular "clicking on" corresponding icons, generally with the help of a graphical user interface. In this way, in one design a safety monitoring system can be configured easily, rapidly and/or error-proof and in particular be adapted to different robot assemblies and/or robot work processes. The configuration means, the evaluation and reaction means and/or the output means can be implemented entirely or partially in a controller of the robot assembly, in particular—at least sometimes—on a hand-held control device with a graphical input/output pad. Similarly, in particular configuration means can also be implemented in an external device or through an external device, for example a laptop or the like, wherein the external device in one design during operation is not connected to the controller of the robot assembly or can be separated from said controller.

BRIEF DESCRIPTION OF FIGURES

Additional advantages and features arise from the subsidiary claims and the exemplary embodiments. To this end, the only FIGURE shows the following, in partially schematic view:

FIG. 1: a configuration of a safety monitoring system of a robot assembly with a robot, a detection means assembly and a safety monitoring means according to one design of the present invention.

DETAILED DESCRIPTION

FIG. 1 shows a robot assembly with a six-axis jointed arm robot 1 in a workspace delimited by a protective fence. For the purpose of controlling the robot the robot assembly has a controller 3 connected by signals to said robot.

The robot assembly in addition has a detection means assembly with a plurality of detection means for redundant, preferably diverse detection of security quantities. A detection means for detecting a one dimensional security quantity is embodied by an emergency stop switch 2.1, which is connected to the controller 3 by signals, as indicated in dot-dashed lines in FIG. 1. An additional detection means for detecting a multi-dimensional security quantity is embodied by sensors for detecting a position and/or speed of the joints or drives of the robot 1, said sensors likewise being connected to the controller 3 by signals. In one further development this detection means can further process these settings or speed, in particular by a forward transformation, in order to detect a position, orientation or speed of a robot-fixed reference point, in particular of the TCP, of a robot-guided laser tool or the like. An additional detection means for detecting a one dimensional security quantity is embodied by a door sensor for monitoring a protective fence door 2.2, which, similar to the controller 3 is connected by signals and implements an operator protection monitoring. An additional detection means for detecting a one dimensional security quantity is embodied by a tool sensor for monitoring a robot-guided laser tool 1.1, which, similar to the controller 3 is connected by signals and implements a tool monitoring.

A safety monitoring means of the robot assembly is implemented by hardware by the controller 3, which implements an evaluation and reaction means as defined by the present invention, and a screen 4 with corresponding input means (not shown), for example a touch screen, a mouse, a keyboard or the like, which implements a configuration an output means as defined by the present invention, being implemented by software by corresponding installed programs or program modules. In particular the controller 3 and the screen 4 with corresponding input means are equipped by programs to carry out the following described inventive method.

The configuration means 4 is equipped to configure a linking function arrangement, which in the exemplary embodiment has several linking functions V1, V2 and V3, which are shown or arranged in FIG. 1 line by line. In one further development a user can generate additional linking functions (not shown).

The linking functions V1, V2 and V3 can be optionally activated (FIG. 1: "A") or deactivated (FIG. 1: "−A") by the user by clicking on the corresponding field in the left column in FIG. 1. In the state shown in FIG. 1 the two upper linking functions V1 and V2, which have already been configured, are activated, while the lower linking function V3, which is currently being configured, is still deactivated. In the second column the name of the linking function is shown, it can be parameterized or entered by the user in one further development, for example "EMERGENCY STOP!" instead of "V1" or the like.

In all linking functions V1-V3 there are three monitoring functions of a monitoring function arrangement logically linked to one another. The number of monitoring functions linked to one another is fixed and predetermined in this design and is three, wherein in FIG. 1 the three monitoring functions linked to one another are shown in the third, fourth and fifth columns of the corresponding line of the respective linking function. It should be pointed out that the graphic representation shows one design of the present invention purely by way of example.

As one recognizes at the third line or linking function V3, which is currently being configured, the monitoring functions are preallocated initially or by default with a dummy monitoring function D, which always has a violated state ($Z_D$="violated").

The monitoring functions of the linking functions V1-V3 are configured in the exemplary embodiment, as indicated in FIG. 1 by a dash-lined input arrow for the third line or linking function V3, which is currently being configured, by activation of an icon, by having the user select the respective monitoring function from several predefined monitoring functions or a predefined monitoring function arrangement or library, which is indicated in FIG. 1 on the lower right edge of the screen 4.

In the state shown in FIG. 1, a speed monitoring function G is selected as the first monitoring function of the linking function V3, for example by "drag & drop" or clicking on the area in the linking function and then clicking on the desired monitoring function in the monitoring function arrangement, said speed monitoring function then having a violated state whenever the TCP of the robot 1 exceeds a speed G1 parameterized by the user. To this end a parameterized instance G<G1 of the speed monitoring function G is implemented in the linking function V3.

Subsequently or in advance the user selects in similar manner one reaction state from several predefined reaction states from several predefined reaction states or from a predefined reaction state arrangement or library, which is indicated in FIG. 1 in the upper right area of screen 4. In the example the user selects a STOP 0.

The three monitoring functions G<G1, D and D of the linking function V3 are logically linked to one another such that the linking function V3 has the reaction state STOP 0 whenever none of the monitoring functions G<G1, D and D of the linking function V3 has the non-violated state. Since the two default preallocated dummy monitoring functions D always have the violated state, the thus configured linking function V3 has the reaction state STOP 0 whenever the controller 3 detects during operation an exceeding of the parameterized speed G1 by the robot 1 or an error in the speed monitoring. Said function then executes a STOP 0. In this way the user has implemented a desired speed monitoring in the safety monitoring system in simple, visual and error-proof manner, which he can then optionally activate by setting "−A" to "A" in the first column.

In the exemplary embodiment an emergency stop monitoring is implemented by the activated linking function V1 in the same way, which logically links an emergency stop monitoring function N, which has a violated state when the emergency stop 2.1 is actuated, to two dummy monitoring functions D in such a way that the linking function V1 has the reaction state STOP 0 whenever all monitoring functions N, D and D of the linking function V1 have the violated or error state. When the controller 3 detects an actuation or an error of the emergency stop switch 2.1 during operation, it correspondingly executes a STOP 0.

The power of this configuration means becomes obvious in particular for the linking function V2: in said linking function an otherwise parameterized instance G<G0 of the speed monitoring function G, which has a violated state when the TCP of the robot 1 exceeds a speed parameterized by the user G0 (<G1), a tool monitoring function W, which has a violated state when the robot-guided laser tool 1.1 is activated, and an operator protection monitoring function B, which has a violated state when the door sensor reports an opened protective fence door 2.2 to the controller 3, are logically linked to one another such that the linking function V2 has the reaction state STOP 1 whenever none of the monitoring functions G<G0, W and B of the linking function V2 has the non-violated state or each of these functions has either the violated or the error state.

Hence the robot 1 may move faster than G0 when its laser tool 1.1 is safely or correctly detected as disconnected or no human being is in its workspace due to the safely or correctly detected closed protective fence door 2.2. The robot will only shut down if it moves too rapidly or its speed is not correctly detected (G<G0 "violated" or "error"), although its laser tool is switched on or said laser tool cannot be safely detected due to an error (W "violated" or "error") and due to an opened protective fence door a human being could be in its workspace or this cannot be safely detected due to an error (B "violated" or "error").

On the other hand, in one embodiment, as long as the robot 1 is safely traveling slowly enough (Speed monitoring function G<G0 "non-violated") or the laser tool 1.1 is safely disconnected (Tool monitoring function W "non-violated") or no human being can safely be in its workspace (Operator protection monitoring function B "non-violated"), the robot does not have to be shut down, even if one of these monitoring functions has a malfunction, for example a speed, tool or protective fence door sensor is defective and thus triggering a "violated" state as long as at least one "non-violated" state is triggered. Such a malfunction, as a result of which the corresponding monitoring function has the error state, will be output by a corresponding optical message on the output means 4 to the user and by means of technical signals to the controller 3, which then for example can suppress an activation of the laser tool 1.1.

If the speed monitoring detects an exceeding of the higher threshold speed G1, it necessarily also detects an exceeding of the lower threshold speed G0<G1. Hence the two linking functions V2 and V3 each have the reaction state. In this case the controller 3 executes the higher-ranking reaction STOP 0.

The individual monitoring functions or monitoring function instances N, G<G0, G<G1, W and B can each, dependent on the signal inputs of the emergency stop switch, laser tool sensor, protective fence door sensor and the joint drives of the detection means assembly, have the violated state, the non-violated state differing therefrom and the error state differing from both. The emergency stop monitoring function N has the violated state when the emergency stop switch 2.1 is actuated, has the error state when the emergency stop switch 2.1 or its signal connection to the controller 3 is defective, for example a two channel error is present and detected, and has the non-violated state when or as long as neither the violated state nor the error state is present. The speed monitoring function G has the violated state when the threshold speed G0 or G1 is exceeded, has the error state when a joint drive position or speed sensor or its signal connection to the controller 3 is defective, and has the non-violated state when or as long as neither the violated state nor the error state is present. The tool monitoring function W has the violated state when the laser tool 1.1 is activated, has the error state when the laser tool sensor or its signal connection to the controller 3 is defective, and has the non-violated state when or as long as neither the violated state nor the error state is present. The operator protection monitoring function B has the violated state when the sensor of the protective fence door 2.2 detects that this is opened, has the error state when the sensor or its signal connection to the controller 3 is defective, and has the non-violated state, when or as long as neither the violated state nor the error state is present. As stated above, similarly, for example the operator protection monitoring function B can have the non-violated state when the sensor of the protective fence door 2.2 actively outputs a "closed" signal, can have the error state when the sensor or its signal connection to the controller 3 is defective, and can have the violated state when or as long as neither the non-violated state nor the error state are present.

According to the foregoing explained configuration the safety monitoring system can be executed by the controller 3 and to this end can transfer a corresponding program or data from the configuration means 4 to said controller, as indicated by a signal connection in dot-dashed lines in FIG. 1. Similarly, the controller 3 can, on the contrary output for example an error message as a result of an error state, in particular of an activated monitoring function on the screen 4. During operation the controller 3 continuously evaluates the above explained monitoring and linking functions.

In the above exemplary embodiment the invention was explained in terms of examples with the help of first linking functions V1-V3 with a first dummy monitoring function D, which trigger a STOP 0 or STOP 1. Of course, in addition or as an alternative, other reactions or reaction states can be provided, in particular a STOP 2 or a corresponding assignment, in particular deactivation or disconnection of a secure output (not shown). In addition or as an alternative to the first linking functions V1-V3 in particular also second or inverted linking functions can be provided (not shown). In addition or as an alternative, one or more monitoring functions, of which in turn with N, G, W, B and D only one is shown by way of example, can be inverted and linked as monitoring functions.

REFERENCE LIST

1 Robot
1.1 Laser tool
2.1 Emergency stop switch
2.2 Protective fence door(sensor)
3 Controller
4 Screen

What is claimed is:

1. A method for safety monitoring of a robot assembly with at least one robot, comprising:
detecting, by a plurality of sensors coupled to the robot assembly, a plurality of state signals indicating a state, wherein the state is one of a violated state, a non-violated state, or an error state;
configuring, by a controller, a first linking function that includes a plurality of monitoring functions of a monitoring function arrangement, wherein the monitoring functions indicate the violated state, the non-violated state, or the error state, depending on the plurality of signals generated by the plurality of sensors and transmitted to the controller associated with the robot assembly;
logically linking, by the controller, each monitoring function associated with the first linking function to one another such that the first linking function has:
a reaction state whenever all of the sensors detect the plurality of signals indicating the violated and/or error state so that all of the monitoring functions of the first linking function generated by the controller indicates the violated and/or error state, and
does not have a reaction state whenever no monitoring function from the plurality of monitoring functions indicates the violated state and/or error state, and/or
does not have a reaction state whenever at least one monitoring function does not indicate the violated and/or error state and at least one monitoring function does indicate the violated and/or error state, wherein the reaction state is executed by the controller in response to all of the monitoring functions being in the violated and/or error state.

2. The method according to claim 1, further comprising:
parameterizing and/or selection of the reaction state of at least one linking function of the linking function arrangement from several predefined reaction states,
parameterizing and/or for selection of at least one monitoring function of at least one linking function of the linking function arrangement from several predefined monitoring functions, or
activation of at least a linking function of the linking function arrangement.

3. The method according to claim 1, further comprising:
continuously evaluating the linking function arrangement during an operation of the robot assembly and for triggering a reaction dependent on a reaction state of the linking function arrangement.

4. The method according to claim 3, further comprising:
triggering a higher-ranking reaction depending on the reaction states of at least two linking functions of the linking function arrangement.

5. The method according to claim 1, further comprising:
outputting a displaying signal when a monitoring function has the error state.

6. The method according to claim 1, wherein the monitoring function arrangement has at least one of an emergency stop monitoring function, an operating mode monitoring function, a speed monitoring function, a space monitoring function, an operator protection monitoring function, a tool monitoring function, an axis adjustment monitoring function, a monitoring function of an in particular secure input, or a dummy monitoring function.

7. A method for a safety monitoring system of a robot assembly with at least one robot to execute safety monitoring as set forth in claim 1, comprising:
configuring the linking function arrangement.

8. The method according to claim 7, further comprising at least one of:
parameterizing and/or selection of the reaction state of at least one linking function of the linking function arrangement from several predefined reaction states,
parameterizing and/or selection of at least one monitoring function of at least one linking function of the linking function arrangement from several predefined monitoring functions, or
activating at least one linking function of the linking function arrangement.

9. The method according to claim 7, comprising:
continuously evaluating the linking function arrangement during an operation of the robot assembly, and
triggering of a reaction dependent on a reaction state of the linking function arrangement.

10. The method according to claim 9, wherein a higher-ranking reaction is triggered depending on the reaction states of at least two linking functions of the linking function arrangement.

11. The method according to claim 7, further comprising:
outputting displaying signals when a monitoring function has the error state.

12. The method according to claim 7, wherein the monitoring function arrangement has at least one of:
an emergency stop monitoring function, an operating mode monitoring function, a speed monitoring function, a space monitoring function, an operator protection monitoring function, a tool monitoring function, an axis adjustment monitoring function, a monitoring function of a secure input, or a dummy monitoring function.

13. Computer program product with a program code stored on a non-transitory medium that can be read by a computer for carrying out the method according to claim 7.

14. A robot assembly comprising:
at least one robot;
a sensor assembly with at least two sensors for detecting a security quantity; and
a controller according to claim 7, whose monitoring functions can have a violated state, a non-violated state, or an error state, dependent on at least one signal input generated by the sensor assembly.

15. A method for safety monitoring of a robot assembly with at least one robot, comprising:

detecting, by a plurality of sensors coupled to the robot assembly, a plurality of state signals indicating a state, wherein the state is one of a violated state, a non-violated state, or an error state;

configuring, by a controller, a first linking function that includes a plurality of monitoring functions of a monitoring function arrangement, wherein the monitoring functions indicate the violated state, the non-violated state, or the error state, depending on the plurality of signals generated by the plurality of sensors and transmitted to the controller associated with the robot assembly;

logically linking, by the controller, each monitoring function associated with the first linking function to one another such that the first linking function has a reaction state:

whenever all of the sensors detect plurality of signals indicating the violated and/or error state so that all of the monitoring functions of the first linking function generated by the controller indicates the violated and/or error state; and does not have a reaction state whenever at least one monitoring function from the plurality of monitoring functions does not indicate the violated and/or error state and at least one monitoring function does indicate the violated and/or error state, wherein the reaction state is executed by the controller in response to all of the monitoring functions being in the violated and/or error state; and/or configuring, by the controller, a second linking function that includes a plurality of monitoring functions of the monitoring function arrangement; and logically linking, by the controller, each of the monitoring functions associated with the second linking function to one another such that the second linking function does not have a reaction state whenever all of the monitoring functions indicate the non-violated state so that all of the monitoring functions of the second linking function generated by the controller indicate the non-violated state.

16. The method according to claim 15, further comprising:

parameterizing and/or selection of the reaction state of at least one linking function of the linking function arrangement from several predefined reaction states, parameterizing and/or for selection of at least one monitoring function of at least one linking function of the linking function arrangement from several predefined monitoring functions, or activation of at least a linking function of the linking function arrangement.

17. The method according to claim 15, further comprising:

continuously evaluating the linking function arrangement during an operation of the robot assembly and for triggering a reaction dependent on a reaction state of the linking function arrangement.

18. The method according to claim 17, further comprising:

triggering a higher-ranking reaction depending on the reaction states of at least two linking functions of the linking function arrangement.

19. The method according to claim 15, further comprising:

outputting a displaying signal when a monitoring function has the error state.

\* \* \* \* \*

UNITED STATES PATENT AND TRADEMARK OFFICE
CERTIFICATE OF CORRECTION

PATENT NO. : 9,746,843 B2
APPLICATION NO. : 14/151348
DATED : August 29, 2017
INVENTOR(S) : Uwe Bonin et al.

It is certified that error appears in the above-identified patent and that said Letters Patent is hereby corrected as shown below:

In the Specification

Column 5, Line 27, reads "non essential monitoring can be" and should read -- non-essential monitoring can be --.

Column 9, Lines 7-8, read "manner one reaction state from several predefined reaction states from several predefined reaction states or from a" and should read -- manner one reaction state from several predefined reaction states or from a --.

In the Claims

Claim 1
Column 11, Lines 40-42, read "error state so that all of the monitoring functions of the first linking function generated by the controller indicates the" and should read -- error state so that all of the monitoring functions of the first linking function generated by the controller indicate the --.

Claim 2
Column 11, Line 57, reads "parameterizing and/or for selection of at least one" and should read -- parameterizing and/or selection of at least one --.

Claim 3
Column 11, Line 65, reads "during an operation of the robot assembly and for" and should read -- during an operation of the robot assembly and --.

Claim 15
Column 13, Line 17, reads "whenever all of the sensors detect plurality of signals" and should read -- whenever all of the sensors detect the plurality of signals --.

Signed and Sealed this
Twelfth Day of December, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,746,843 B2

Claim 15
Column 13, Lines 19-20, read "the monitoring functions of the first linking function generated by the controller indicates the violated" and should read -- the monitoring functions of the first linking function generated by the controller indicate the violated --.

Claim 16
Column 14, Line 12, reads "parameterizing and/or for selection of at least one" and should read -- parameterizing and/or selection of at least one --.

Claim 17
Column 14, Lines 21-22, read "during an operation of the robot assembly and for triggering a reaction dependent on a reaction state of" and should read -- during an operation of the robot assembly and triggering a reaction dependent on a reaction state of --.